United States Patent [19]

Saladin et al.

[11] Patent Number: 5,262,941
[45] Date of Patent: Nov. 16, 1993

[54] EXPERT CREDIT RECOMMENDATION METHOD AND SYSTEM

[75] Inventors: Emery F. Saladin, Chesterfield, Mo.; Karol V. Mate, Merrimac, Mass.; Harvey Gers, Chesterfield; Kurt A. Ruhlin, Webster Groves, both of Mo.

[73] Assignee: ITT Corporation, New York, N.Y.

[21] Appl. No.: 502,850

[22] Filed: Mar. 30, 1990

[51] Int. Cl.[5] .................... G06F 15/20; G06G 7/52
[52] U.S. Cl. ................................ 364/408; 364/406
[58] Field of Search .................... 364/401, 406, 408

[56] References Cited

U.S. PATENT DOCUMENTS

T998,008  9/1980  Delano ........................ 364/401
4,774,664  9/1988  Campbell ...................... 364/408

OTHER PUBLICATIONS

Burgess, The Electronic Experts, Washington Post, 1 Oct. 1989, H1, H4.

Primary Examiner—Roy N. Envall, Jr.
Assistant Examiner—Ari M. Bai
Attorney, Agent, or Firm—White & Case

[57] ABSTRACT

An expert floorplan credit recommendation method and system, comprising a database and stored program for arriving at a credit recommendation by processing data on a computer by means of a decision matrix tree that emulates the thought processes of credit experts.

9 Claims, 5 Drawing Sheets

RECOMMENDATION #27

|  | C/L> 300% AVG INV | NET SPP DEFICIT > 10% | CURRENT OWNERSHIP 10+ YRS | 5+ YRS WITH CMF | OTHERWISE |
|---|---|---|---|---|---|
| GOOD | REVIEW | REVIEW | RECOMMEND | RECOMMEND | RECOMMEND |
| SAT | REVIEW | REVIEW | RECOMMEND | RECOMMEND | RECOMMEND |
| MARG | REVIEW | REVIEW | REVIEW | REVIEW | REVIEW |
| POOR | NOT REC. | NOT REC. | REVIEW | REVIEW | NOT REC. |
| UNK | NOT REC. | NOT REC. | NOT REC. | NOT REC. | NOT REC. |

FINAL RATING #26

NET HARD COLLATERAL

OVERALL RATING

|  | 75% GD | 35% SAT | 10% MG | 0% PR | UNK |
|---|---|---|---|---|---|
| GOOD | G | G | G | G | G |
| SAT | G | G | G | S | S |
| MARG | G | S | S | M | M |
| POOR | S | M | P | P | P |
| UNK | U | U | U | U | U |

OVERALL RATING #25

DEALER RATING

FINANCIAL

|  | GD | SAT | MG | PR | UNK |
|---|---|---|---|---|---|
| GOOD | G | G | S | M | U |
| SAT | G | S | M | P | U |
| MARG | M | M | M | P | U |
| POOR | P | P | P | P | U |
| UNK | U | U | U | U | U |

FIG. 1

FINANCIAL #13

FYE FINANCIALS

INTERIM FINANCIAL

|  | GD | SAT | MG | PR | UNK |
|---|---|---|---|---|---|
| GOOD | G | S | M | M | M |
| SAT | G | S | M | M | M |
| MARG | S | M | M | P | P |
| POOR | M | M | M | P | P |
| UNK | G | S | M | P | U |

TO INTERIM FINANCIAL   TO FYE FINANCIAL

DEALER RATING #20

COLLATERAL

CHARACTER

|  | GD | SAT | MG | PR | UNK |
|---|---|---|---|---|---|
| GOOD | G | G | M | P | U |
| SAT | G | S | M | P | U |
| MARG | M | M | M | P | U |
| POOR | M | P | P | P | U |
| UNK | M | M | P | P | U |

TO CHARACTER   TO COLLATERAL

FIG. 2A

```
                    TO DEALER RATING
                       TABLE #20
                           │
                           │

COLLATERAL       DIR. COLLATERAL
                 #19             SAT    PR
                              GD     MG     UNK
                       GOOD  │G│S│M│P│P│
              MFG.    SAT    │S│S│M│P│P│
              COLLAT. MARG   │S│S│M│P│P│
                       POOR  │M│P│P│P│P│
                       UNK   │M│P│P│P│P│

MFG          MFG. STRENGTH                  DEALER       DOCUMENT STRENGTH
  COLLATERAL      SAT    PR                   COLLATERAL       SAT    PR
     #18       GD     MG     UNK                  #17       GD     MG     UNK
         GOOD  │G│S│M│P│P│                          GOOD  │G│G│S│G│U│
  PRODUCT SAT  │S│S│M│P│P│                  SOFT    SAT   │G│S│M│P│U│
  LINE    MARG │S│M│P│P│P│                  COLL    MARG  │S│S│M│P│U│
         POOR  │M│M│P│P│P│                          POOR  │S│S│M│P│U│
         UNK   │U│U│U│U│U│                          UNK   │S│S│M│P│U│

MFG        MFG FINANCIAL RATING
               STRENGTH       SAT    PR
                 #16       GD     MG     UNK
                       GOOD  │G│S│M│P│P│
              MFG.    SAT    │S│S│M│P│P│
              BUYBACK MARG   │S│M│M│P│P│
                       POOR  │M│P│P│P│P│
                       UNK   │P│P│P│P│U│
```

EXPERT CREDIT RECOMMENDATION METHOD AND SYSTEM

BACKGROUND AND SUMMARY OF THE INVENTION

Expert systems for making credit recommendations are generally based on numeric scoring and do not particularly reflect the decision process of a credit expert. This invention, on the other hand, comprises an expert credit method and system which use a decision matrix tree to emulate the decision process of credit experts in analyzing a credit applicant and recommending whether to extend the credit sought.

The method used is to construct and implement, for example, in a software-controlled general purpose digital computer, a decision matrix tree. The tree is constructed so as to emulate the thought processes of human credit experts. Each matrix in the tree compares two pertinent characteristics and in turn represents, and provides as output, another pertinent characteristic which is then available as input to a subsequent matrix in the tree. In each matrix, each of the two characteristics being compared is depicted on one axis of the matrix. Each of the two axes of the matrix has provision for a number of different values of the characteristic depicted on that axis. Each box in the matrix represents a different combination of values of those two input characteristics. For each of these possible combinations, the matrix determines the value of the characteristic represented by the matrix itself. Thus, each matrix accepts as input two values, one on each axis. Each matrix delivers as output a single value, determined by the value of the matrix box defined by the two values on the axes.

Each input value to a matrix emanates from one of two sources. One or both input values for a matrix may be output from preceding matrixes in the matrix decision tree. Other input values are supplied from the "knowledge base," which is a database resident in or accessible to the computer and which has been supplied with information derived from credit experts.

The form of the decision matrix tree, as well as the identity of the characteristics compared in the various matrixes, the output characteristic from each matrix, the order of the matrices, and the designations of values in each box of each matrix are all the product of extensive contribution by credit experts.

A preferred embodiment of the invention employs a general purpose computer under the control of rule-based expert system artificial intelligence software that emulates the decision process of experts in the field of floorplan inventory lending. Industry characteristics and lending practices unique to floorplan lending play a fundamental role in the underlying decision matrix tree and characteristics ("criteria") used in this method and system. As opposed to a numeric scoring method or system, this invention actually compares various factors used by experts in making decisions, to emulate more closely the experts' decision process in reaching a recommendation on whether to extend credit.

In addition to recommending a determination on whether to extend the credit sought, the method and system of the invention may provide output, usually in the form of computer print-out or computer screen displays, on matters supporting the ultimate recommendation. For example, the method and system may provide as output a summary of the criteria input, and the recommendation, in a prescribed format. Alternatively or in addition, the method and system may provide as output a sequence of observations regarding criteria perceived as positive, and a sequence of observations regarding criteria perceived as negative. The output may include observations made directly by the user (and input to the computer) as well as those generated by the invention. The output from the invention may also include detailed listings and analyses of various criteria deemed significant to the recommendation (e.g., information relating to financial statements). This aspect of the invention is of assistance in making manifest the rationale behind the recommendation. It is also useful in training personnel in the credit determination process.

The expert method and system is designed to aid and train floorplan credit analysts in making credit decisions while ensuring consistency in credit policy. The system is designed for use on personal computers. The preferred embodiment operates in connection with IBM ® and IBM-compatible personal computers having at least a 640K byte memory, a 20 megabyte disk drive and a printer. Analysts input information into the system, which provides them with results of an extensive analysis both on screen and through several printed reports.

The method and system involve two interacting components. The first component is a database management program which also comprises a user interface (generally a screen display) that prompts an individual analyst for all information pertinent to a credit decision. In a preferred embodiment of the invention, PARADOX ® relational data base software (version 3.01), marketed by Borland International, is used as the database manager. The information input by the user in response to prompts includes the type of credit line requested, the level of management experience, types of collateral and inventory, type of business or industry, credit history and financial information. Mathematical calculations are performed on certain of this information by stored software which generates financial and other ratios pertinent to a decision. This data is then maintained in the database for retrieval at any time. The software may also provide for the electronic transfer of client data to other locations, e.g., regional offices.

The second component of the method and system is a computer program written in a language suited to artificial intelligence expert systems, such as Prolog Version 5.x, marketed by Arity Corporation. This program is the "brain" of the method and system, analyzing client information that it obtains from the database manager. The analysis performed by the program emulates the reasoning patterns of floorplan credit experts by using a decision matrix tree, comprising a plurality of decision matrices arranged in branches. To arrive at the final recommendation to grant or deny credit, or further review the matter, the program must perform each of the operations in each branch of the decision tree.

At the initial stage, the process and system compare each of a number of specific criteria to levels or ranges characterized in a particular manner by credit experts for the specific business or industry. Some of the relevant criteria are: direct payment experience of the user with the borrower, payment experience of other creditors, industry experience of the borrower's management, personal character of management, strength of industry, strength of product sold, strength of suppliers, type and strength of collateral, type and strength of documentation, sales level and trend, gross margins and trend, net margins and trend, leverage position and trend, and liquidity position and trend.

With the information obtained from this analysis, the process proceeds through several series of matrices arranged in branches whereby the strengths and weaknesses of each criterion category are compared with strengths and weaknesses of one or more other criterion categories. The result of each such comparison is then used in another comparison in a subsequent decision. Consideration is given to the significance of each category relative to the overall decision by its position in the tree. Those categories deemed more important in the final decision are dealt with last. This analysis process is unlike credit scoring systems because numeric weights are not used. Instead, the program actually considers the strength of one criterion in relation to another criterion, making many such decisions throughout the analysis process. For example, the program may compare components of a balance sheet and reach its decision based on the overall strength of the balance sheet alone. At the same level, the program is comparing other components to decide the strength of the balance sheet trend, income statement and the income statement trend. The analysis continues by then comparing these new decisions to one another. This method is duplicated for all aspects of the decision process.

As the analysis progresses, and based on the criteria and results of criteria comparisons, the program constructs comments unique to each client indicating the status of each important element of floorplan lending. Upon completion these comments are transferred to the database management system for storage and retrieval.

Output from the method and system may include an "Executive Summary" designed to provide a quick look at the condition of the most significant factors, positive and negative, which pertain to the credit decision. Comments presented in this summary are generated through the analysis process and are unique to each client. The output from the method and system may also include a standard report indicating the result of each major step in the analysis and a summary of data input. Additionally, the method and system may provide standardized financial spreadsheets which include financial ratios relating to inventory financing.

The output from this method and system is used as a tool in making credit decisions and can also be used for training credit analysts in the proper requirements of floorplan lending. Use of the method and system helps a lending organization ensure a uniform standard in the credit evaluation process and helps to eliminate arbitrary considerations from the decision. It also provides a means for better and more thorough supervision of the credit decision processes of subordinates. The system further highlights key issues, both positive and negative, and by inference indicates those areas that need to be addressed in order to make a transaction more favorable.

BRIEF DESCRIPTION OF FIGURES

FIG. 1. Depicts the branch structure of the decision matrix tree comprising a fiscal year end financial branch, interim financial branch, and a dealer branch which further comprises a collateral branch and a character branch.

FIGS. 2A and 2B Depicts the financial branch of the decision matrix tree.

FIG. 3. Depicts the collateral branch of the decision matrix tree.

FIG. 4. Depicts the character branch of the decision matrix tree.

DETAILED DESCRIPTION OF THE INVENTION

Figure 2A:
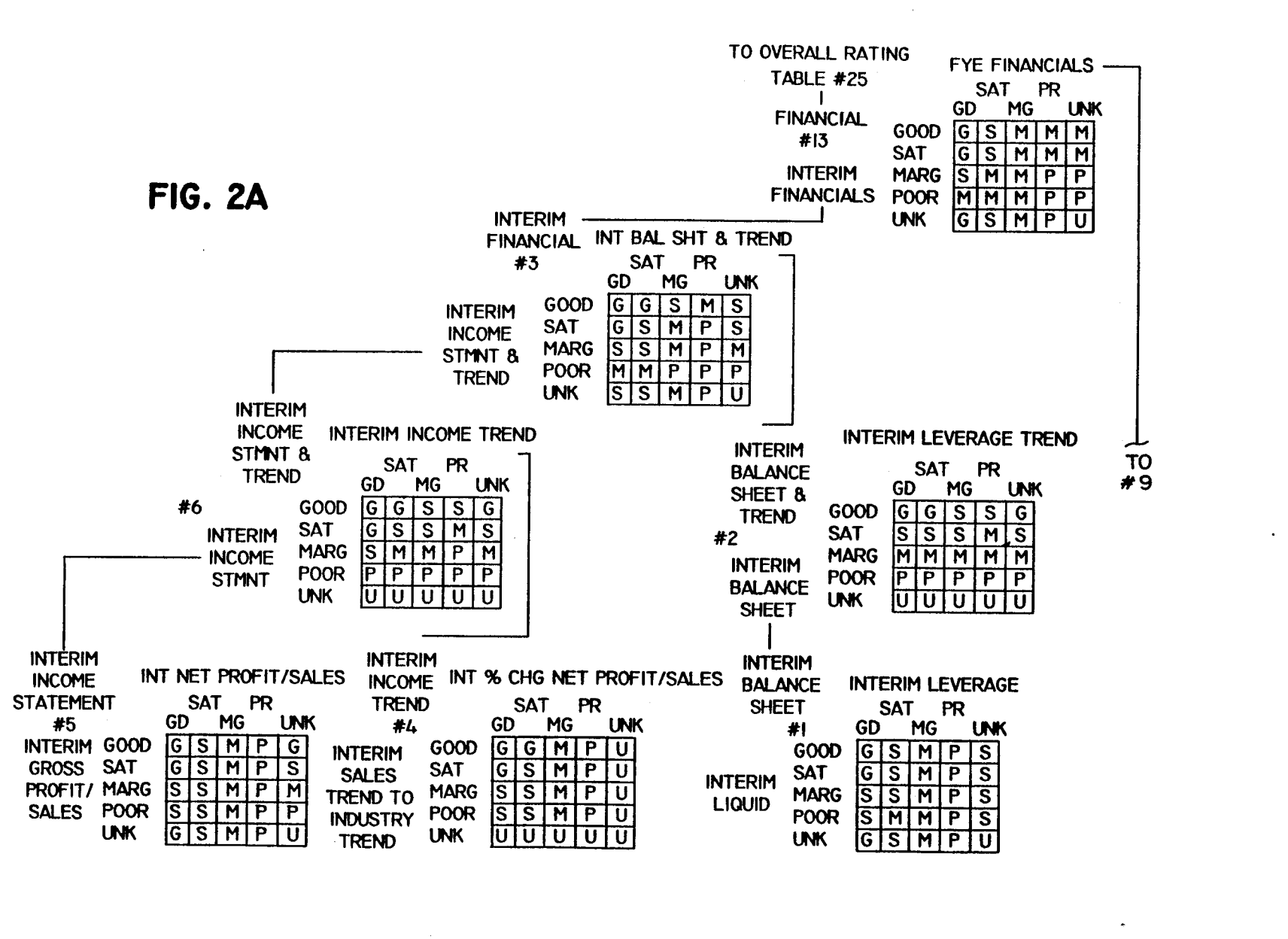
Figure 2B:
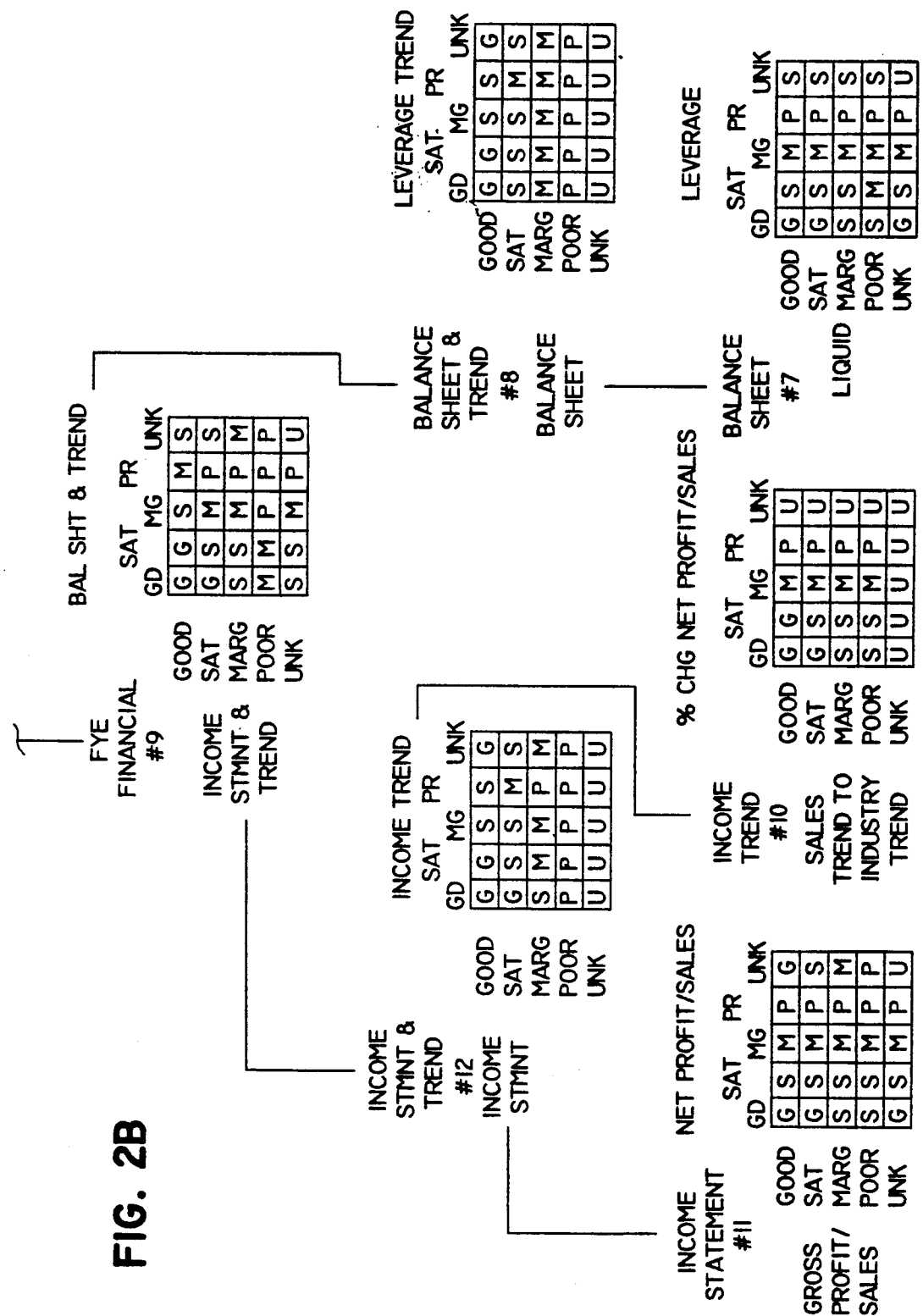

The specific floorplan expert credit method and system embodiment of the invention works essentially as follows. A PC-based program written in Paradox application language guides the credit analyst user through the data input phase with screen prompts. Necessary calculations may also be performed by this program on the data. The input data and the results of those calculations are then stored in the database, which in this case is the relational database, Paradox. The Paradox application language program then stores the data and, upon command by the user, formats the required data in a separate ASCII file. That program then transfers control to the logic or artificial intelligence expert program, which in this embodiment is written in Prolog. The logic then retrieves from the ASCII file the data for analysis, and calls on its knowledge base for the specific product line-dependent standard data, which is updated for economic or policy changes periodically, e.g., semi-annually. With the standard data, the input data and the modified input data the logic then performs its analysis according to the decision matrix tree depicted in FIGS. 1-4. After the analysis the logic arrives at a result, i.e., a credit recommendation, and also generates unique comments according to each analysis. The results are then processed into a form which is imported into the database where it is stored and may be displayed or printed.

Referring to FIG. 1, the expert system computer program is comprised of a decision matrix tree, which is organized into branches. Each branch comprises one or more decision matrices positioned in sequence according to the weight or influence on the final decision of the criteria analyzed in that matrix.

Figure 4:
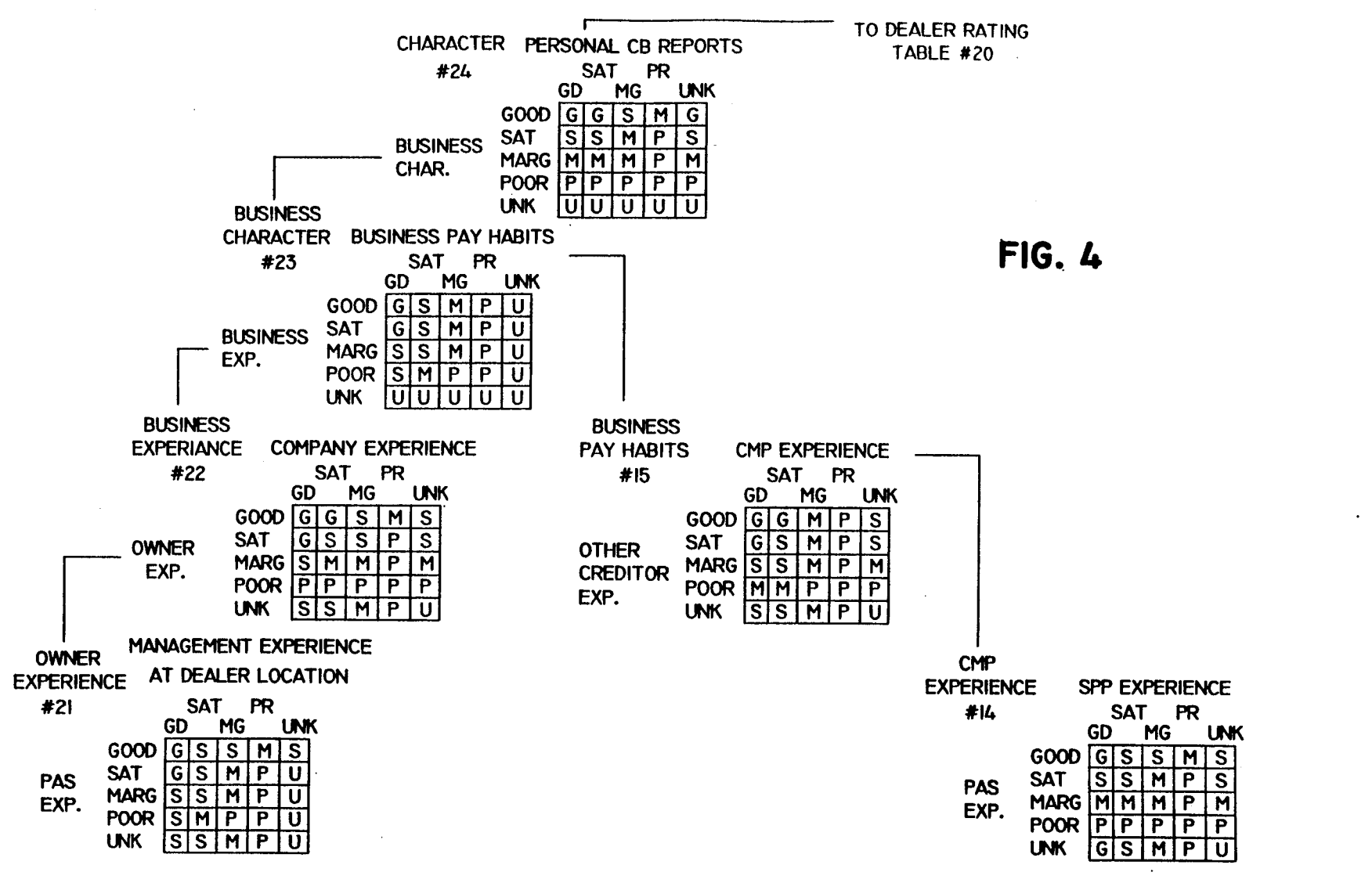

In the invention's preferred embodiment, which concerns floorplan credit financing, the decision matrix tree is organized into two major branches, the financial branch FIGS. 2A and 2B and the dealer branch FIGS. 3 and 4. The financial branch in turn is further differentiated into an interim financial branch and a fiscal-year-end financial branch, while the dealer branch is differentiated into a character branch FIG. 4 and a collateral branch FIG. 3.

In the preferred embodiment each decision matrix in is depicted as a 5×5 grid with an "x" and "y" axis. Each axis presents one of the two criteria compared in that decision matrix. Each axis provides space for five ratings for the criterion depicted: "good", "satisfactory", "marginal", "poor" and "unknown". The predetermined values for each rating for each criterion or factor is stored in the program's knowledge base. Each box in the grid is designated by one of the same five ratings, thereby assigning that rating to a situation characterized as having the criteria ratings specified on the "x" and "y" axes corresponding to that box. I.e., once the value of the two characteristics being compared is determined, a box in the grid is defined, and the value of that box is the value assigned to the output characteristic.

The financial branch of the decision tree, depicted in FIGS. 2A and 2B, is comprised of decision matrices 1-13. In the preferred embodiment of this system the financial branch divides into the interim financial sub-branch, which comprises the decision matrices 1-6, and the fiscal-year-end ("FYE") sub-branch, comprising matrices 7—12. These two separate sub-branches have similar form. However, the FYE sub-branch of the decision matrix is constructed by using data from fiscal year end financial statements, whereas the interim sub-branch is constructed by using data from interim financial statements. The operations on the data by the expert program, however, are the same for both sub-branches. In order to simplify this description the financial branch operation will be described generically, with the understanding that the sequence and operations apply both to the interim and FYE branches.

Balance Sheet decision matrix 1 (for FYE, or 7 for Interim) compares Liquidity (or Interim Liquidity) for each specific product line with the Leverage (or Interim Leverage). The term "liquidity" is defined as the ratio of current assets to current liabilities. The value for the criterion "Liquidity" is obtained by comparing the specific dealer's liquidity for the product line in question with standard liquidity ranges stored in the logic's knowledge base, to obtain a value of "good," "satisfactory," "marginal," "poor" or "unknown." The term "leverage" is defined as debt to tangible net worth. The value of the criterion leverage is determined by comparing the dealer's leverage with the standard leverage ranges stored in logic's knowledge base. When values have been determined for Liquidity and Leverage, the Balance Sheet matrix (which is stored in the knowledge base) assigns a value to the criterion Balance Sheet.

The value resulting from the Balance Sheet matrix 1 (or 7) is then further processed in the Balance Sheet and Trend matrix 2 (or 8), where the criterion Balance Sheet is compared to the criterion Leverage Trend. The term "leverage trend" is defined as the change in leverage. Logic obtains a value for the criterion Leverage Trend by comparing the leverage trend of this specific dealer with the leverage trend ranges stored in the knowledge base. The resulting rating of "good", "satisfactory", "marginal", "poor" or unknown is then compared to the Balance Sheet value from matrix 1 (or 7). The resulting Balance Sheet Trend value of matrix 2 (or 8) is then used in a comparison in decision matrix 3 (or 9), the Financial matrix, where it is compared with the value for Income Statement and Trend, which results from matrix 6 (or 12).

To arrive at a decision from matrix 6 (or 12) the logic program must first start with processing a decision from matrices 4 and 5 (or 10 and 11). The Income Trend decision matrix 4 (or 10) consists of a comparison of Sales Trend, to percent change in Net Profit to Sales ratio. The Sales Trend criterion is specific to each different product line, and the value is based on ranges of percentage increases calculated or expected in this specific product line. These values are stored in the logic's standard knowledge base. The percent change in the net profit to sales ratio is calculated based on the dealer's net profit before tax. The specific value of the criterion Net Profit to Sales for the dealer is assigned based on the standard ranges stored in the logic's knowledge base. This value is then compared in matrix 4 (or 10) to Sales Trend to give the value of Income Trend Criterion. The Income Trend criterion of matrix 4 (or 10) is then used, as already described, in a comparison in matrix 6 (or 12) with the Income Statement criterion to determine Income Statement and Trend.

The Income Statement decision matrix 5 (or 11) compares the criterion of Gross Profit on Sales, to the criterion of Net Profit on Sales. The ratio of gross profit on sales is calculated for the distinct product line, and compared to the standard ranges for that product line stored in the logic's knowledge base, to assign a value to the criterion Gross Profit on Sales. Once a value is assigned, it is inserted into decision matrix 5 (or 11) and compared to the Net Profit on Sales criterion for the dealer. Net profit on sales is a percentage ratio calculated for the specific dealer and compared to the standard ranges for the specific product line stored in the logic's knowledge base to assign a value to the Net Profit on Sales criterion. The value of the Income Statement decision matrix 5 (or 11) is then used in a comparison with the Income Trend criterion from matrix 4 (or 10) in decision matrix 6 (or 12), to determine the Income Statement and Trend criterion. The criterion derived from the Income Statement and Trend matrix 6 (or 12) is then used in the Financial decision matrix 3 (or 9), which compares it against the Balance Sheet and Trend criterion in decision matrix 2 (or 8).

As discussed previously, the decision matrices 1, 2, 3, 4, 5 and 6 for fiscal year data are in form identical to decision matrices, 7, 8, 9, 10, 11 and 12 for interim data. The values of the Interim Financial matrix 9 and the Fiscal Year End Financial matrix 3 are used to make the comparison in the Financial matrix 13 to arrive at the Financial criterion. The value of Financial matrix 13 is then further processed by the logic in connection with the value determined by the dealer branch, as described below.

With respect to the Dealer branch, the decision matrix tree is divided into the Character sub-branch FIG. 4 and the Collateral sub-branch FIG. 3. The Character sub-branch is comprised of matrices 14, 15, and 21-24. Matrix 21, Owner Experience, compares the criterion of Management Experience at dealer location to the criterion of Additional Management Experience. Logic compares the number of years of management experience at the particular dealer location to the ranges stored in its knowledge base, assigning the Management Experience criterion a value "good," "satisfactory," "marginal," "poor" or "unknown". The same function is also performed on the Additional Management Experience criterion, which is a measure of how many additional years of experience current dealer management has had in a similar industry. Both these values are evaluated by the logic for this dealer from the standard ranges in the logic knowledge base, and inserted into the matrix. Logic then evaluates matrix 21, arriving at the criterion of Owner Experience. The resulting value is then processed in matrix 22, Business Experience.

The Business Experience matrix 22 compare the criterion Company Experience to the criterion Owner Experience. Company Experience is a function of the number of years the company has been in business. The specific term for the dealer in question is compared by the logic to the standard ranges in the logic's knowledge base, and the value assigned is inserted into matrix 22. After evaluation, the value according the Business Experience matrix is further processed in matrix 23, Business Character.

In the Business Character matrix the Business Experience decision from matrix 22 is compared to the Business Pay Habits criterion derived from matrix 15. To arrive at matrix 15, the logic must first process the Lender's Experience decision from matrix 14. Matrix 14 compares the Pay As Sold ("PAS") criterion, which is defined as the percentage of monthly collections made at the lender's audit of the dealer, to the Schedule Pay Plan ("SPP") experience of the lender with this dealer, calculated in terms of average days late on scheduled payment. The PAS and SPP criteria values for the specific dealer are retrieved by the logic from the database and compared to the standard ranges stored in the logic's knowledge base. These values are inserted into the matrix 14, Lender Experience, and a decision value is calculated.

The Business Pay Habit matrix 15 compares the Lender Experience from matrix 14 to the criterion of Other Creditor Experience. Other Creditor Experience is established by credit ratings collected by the lender from other creditors, usually through telephone solicitation by the lender. The Other Creditor Experience value is determined by the user and input into the logic's knowledge base. The value is retrieved from the knowledge base and compared to Lender Experience from matrix 14. The resulting Business Pay Habit criterion is then further processed in matrix 23 Business Character, where it is compared to the Business Experience criterion from matrix 22. In matrix 23, logic calculates a value and this criterion of Business Character is further processed in the Character matrix 24.

Character matrix 24 compares the criterion of Business Character to the criterion of Personal Credit Bureau Reports. The Personal Credit Bureau Reports criterion concerns the personal credit of any guarantors who will act as guarantors of the loan. Personal Credit Bureau Reports are usually required when, and only when a personal guaranty is held as additional collateral on the loan. The value for Personal Credit Bureau Reports is input into the database and retrieved by the logic. The logic then calculates a value according to matrix 24 and this criterion is further processed in the Dealer Rating matrix 20 where it is compared to the value of the Collateral criterion calculated in the collateral branch of the matrix FIG. 3, as described below.

The Collateral branch of the matrix comprises matrices 16–19. The Collateral branch begins with matrix 16, Manufacturer Strength, which compares the criteria of Manufacturer Buy Back Agreement to Manufacturers' Financial Rating. These criteria concern the manufacturers of the goods on the basis of which the floorplan lender is lending to the dealer. The user determines Manufacturer Financial Rating criteria for each manufacturer of goods sold, and an overall value for this criterion, and inputs that value into the database. The value is inserted into matrix 16. The Manufacturer Buy Back criterion concerns whether the lender has a repurchase agreement with the manufacturer, and the type of repurchase agreement. The logic calculates a value for the Manufacturing Strength criterion based on matrix 16 and this criterion is further processed in matrix 18, Manufacturing Collateral. In matrix 18, the Manufacturing Strength is compared to the Product Line criterion. The Product Line criterion is a function of the percentage of the dealer's credit line to be used on the manufacturer's products. This percentage, calculated for the individual dealer and input to the database is compared to the ranges stored in the logic's knowledge base and a value is inserted into matrix 18.

The resulting decision value is further processed in matrix 19, Collateral. Matrix 19 compares Manufacturing Collateral with the criterion of Dealer Collateral, which is derived from decision matrix 17. Matrix 17, Dealer Collateral, compares the criterion of Soft Collateral with that of Document Strength. Soft Collateral is defined as the personal tangible net worth of the guarantor, as a percentage of the credit line. Based on input to the database, the logic calculates a value for the specific guarantor, compares this value to the standard ranges in its knowledge base, and then assigns a value for the dealer, which is inserted into matrix 17. Document Strength is a measure of the strength of any lien that is placed upon inventory. The user inputs into the database the nature of the lien, and the database converts this information into a Document Strength criterion value.

At this point, both the Financial branch and the Dealer branch have been completely determined, as a value exists for the Financial criterion in matrix 13, and a value exists for the Dealer Rating criterion in matrix 20. These two values are input to the Overall Rating criterion in matrix 25, at which point the expert system has arrived at a value that can be used for making a determination. However, in a preferred embodiment of the invention further operations are performed in matrices 26 and 27 to give more weight to certain factors toward a recommendation decision. The value determined from the Overal Rating matrix 25 is transmitted to the Final Rating matrix 26, where it is compared with Net Hard Collateral. Net Hard Collateral is the portion of the credit line covered by letters of credit, certificates of deposit, and half the value of any mortgages used as collateral. The dollar amount of hard collateral held on the dealer is input into the database. The Paradox application language program calculates Net Hard Collateral as the percent of hard collateral to the proposed credit line discounted for any "SPP deficit." SPP deficit is defined as one less than the ratio of outstanding turn (if known to the lender) or program turn (otherwise), divided by inventory turn. Logic computes a numerical figure for Net Hard Collateral and compares it to predetermined stored ranges, whereupon a value is assigned. This value for Net Hard Collateral is compared with the Overall Rating criterion, to yield a value for the Final Rating criterion. This value for Final Rating is then passed on matrix 27, Recommendation.

The Recommendation matrix is unlike any of the other matrices. Although the "y" axis (Final Rating) has the same five values as do the other matrices, the "x" axis has the following values: credit line is more than 300% of average inventory; net SPP deficit is greater than 10%; current ownership exceeds ten years; dealer has been with lender for more than five years; and Otherwise. Further, the values in each of the 25 boxes comprising the matrix are "Recommend," "Review," and "Not Recommend." This is the final matrix and it embodies the ultimate result of the system. The recommendation is then displayed on screen or by some other output means to the operator who uses it in making his or her credit decision. Further, supporting output may be printed, e.g., in the form of a summary of input data, a sequence of observations generated by the method and system regarding positive and negative criteria, financial data, or an Executive Summary.

The criteria analyzed by the system and compared in the matrices depicted in FIGS. 1, 2, 3 and 4 are listed in Table 1.

TABLE 1

| CRITERIA | PRODUCT LINE | GOOD | SAT | MARGINAL |
| --- | --- | --- | --- | --- |
| pas experience | — | 35 | 50 | 55 |
| spp experience | — | 3 | 5 | 7 |
| company experience | — | 5 | 3 | 1 |
| additional mgt | — | 10 | 5 | 3 |

TABLE 1-continued

| CRITERIA | PRODUCT LINE | GOOD | SAT | MARGINAL |
|---|---|---|---|---|
| experience management | — | 4 | 2 | 0.5 |
| experience personal | — | 1 | 2 | 3 |
| character | | | | |
| other creditor experience | — | 1 | 2 | 3 |
| product line | — | 75 | 50 | 40 |
| document strength | — | 1 | 2 | 3 |
| manufacturer buyback | — | 1 | 2 | 3 |
| manufacturer financial rating | — | 1 | 2 | 3 |
| hard collateral | — | 70.0 | 35.0 | 10.0 |
| soft collateral | — | 50.0 | 0.0 | −50.0 |
| gross profit to sales | mis | 25 | 20 | 17 |
| gross profit to sales | tv | 24 | 20 | 18 |
| gross profit to sales | marine | 23 | 18 | 15 |
| gross profit to sales | mcycle | 20 | 18 | 16 |
| gross profit to sales | rv | 19 | 15 | 13 |
| gross profit to sales | mob home | 18 | 15 | 13 |
| gross profit to sales | ind eq | 23 | 20 | 18 |
| gross profit to sales | office | 24 | 20 | 17 |
| gross profit to sales | keyboard | 33 | 27 | 22 |
| gross profit to sales | unknown | 25 | 20 | 18 |
| interim gp sa | mis | 25 | 20 | 17 |
| interim gp sa | tv | 24 | 20 | 18 |
| interim gp sa | marine | 23 | 18 | 15 |
| interim gp sa | mcycle | 20 | 18 | 16 |
| interim gp sa | rv | 19 | 15 | 13 |
| interim gp sa | mob home | 18 | 15 | 13 |
| interim gp sa | ind eq | 23 | 20 | 18 |
| interim gp sa | office | 24 | 20 | 17 |
| interim gp sa | keyboard | 33 | 27 | 22 |
| interim gp sa | unknown | 25 | 20 | 18 |
| net profit to sales | mis | 2.0 | 0.8 | −0.2 |
| net profit to sales | marine | 2.0 | 0.8 | −0.2 |
| net profit to sales | tv | 1.5 | 0.8 | −0.2 |
| net profit to sales | mcycle | 1.4 | 1.0 | −0.2 |
| net profit to sales | rv | 1.0 | 0.5 | −0.2 |
| net profit to sales | mob home | 1.0 | 0.5 | −0.2 |
| net profit to sales | ind eq | 2.2 | 1.0 | −0.2 |
| net profit to sales | office | 1.5 | 0.8 | −0.2 |
| net profit to sales | keyboard | 2.1 | 1.5 | −0.2 |
| net profit to sales | unknown | 1.5 | 0.5 | −0.2 |
| interim np sa | mis | 2.0 | 0.8 | −0.2 |
| interim np sa | marine | 2.0 | 0.5 | −0.2 |
| interim np sa | tv | 1.5 | 0.8 | −0.2 |
| interim np sa | mcycle | 1.4 | 1.0 | −0.2 |
| interim np sa | rv | 1.0 | 0.5 | −0.2 |
| interim np sa | mob home | 1.0 | 0.5 | −0.2 |
| interim np sa | ind eq | 2.2 | 1.0 | −0.2 |
| interim np sa | office | 1.5 | 0.8 | −0.2 |
| interim np sa | keyboard | 2.1 | 1.5 | −0.2 |
| interim np sa | unknown | 1.5 | 0.5 | −0.2 |
| sales trend | mis | 10 | 5 | 0 |
| sales trend | marine | 5 | 0 | −5 |
| sales trend | mcycle | 0 | −5 | −7 |
| sales trend | tv | 5 | 0 | −5 |
| sales trend | rv | 2 | −3 | −5 |
| sales trend | mob home | 4 | 0 | −5 |
| sales trend | ind eq | 4 | 0 | −5 |
| sales trend | office | 8 | 4 | 0 |
| sales trend | keyboard | 3 | 0 | −3 |
| sales trend | unknown | 5 | 0 | −5 |
| interim sales trend | mis | 10 | 5 | 0 |
| interim sales trend | marine | 5 | 0 | −5 |
| interim sales trend | mcycle | 0 | −5 | −7 |
| interim sales trend | tv | 5 | 2 | −3 |
| interim sales trend | rv | 2 | −3 | −5 |
| interim sales trend | mob home | 4 | 0 | −5 |
| interim sales trend | ind eq | 4 | 0 | −5 |
| interim sales trend | office | 8 | 4 | 0 |
| interim sales trend | keyboard | 3 | 0 | −3 |
| interim sales trend | unknown | 5 | 0 | −5 |
| net profit to sales trend | — | 0.3 | −0.3 | −0.5 |
| interim mp sa trend | — | 0.3 | −0.3 | −0.5 |
| leverage trend | — | 1.2 | 1.5 | 2.0 |
| interim leverage trend | — | 1.2 | 1.5 | 2.0 |
| leverage | — | 4.0 | 6.0 | 12.0 |
| interim leverage | — | 4.0 | 6.0 | 12.0 |
| liquidity | mis | 1.4 | 1.1 | 1.0 |
| liquidity | marine | 1.3 | 1.1 | 1.0 |
| liquidity | mcycle | 1.2 | 1.1 | 1.0 |
| liquidity | tv | 1.2 | 1.1 | 1.0 |
| liquidity | rv | 1.3 | 1.1 | 1.0 |
| liquidity | mob home | 1.2 | 1.0 | 0.9 |
| liquidity | ind eq | 1.2 | 1.0 | 0.9 |
| liquidity | office | 1.4 | 1.1 | 1.0 |
| liquidity | keyboard | 1.3 | 1.0 | 0.9 |
| liquidity | unknown | 1.3 | 1.1 | 1.0 |
| interim liquidity | mis | 1.4 | 1.1 | 1.0 |
| interim liquidity | marine | 1.3 | 1.1 | 1.0 |
| interim liquidity | mcycle | 1.2 | 1.1 | 1.0 |
| interim liquidity | tv | 1.2 | 1.1 | 1.0 |
| interim liquidity | rv | 1.3 | 1.1 | 1.0 |
| interim liquidity | mob home | 1.2 | 1.0 | 0.9 |
| interim liquidity | ind eq | 1.2 | 1.0 | 0.9 |
| interim liquidity | office | 1.4 | 1.1 | 0.9 |
| interim liquidity | keyboard | 1.3 | 1.0 | 0.9 |
| interim liquidity | unknown | 1.3 | 1.1 | 1.0 |

What is claimed is:

1. A computerized expert credit recommendation system useful for credit analysis automation and training credit analysts, comprising:

a) an input means for entering data in response to screen messages;

b) an output means;

c) a programmable digital computer in association with (i) a database management computer program, which prompts in a predetermined sequence of queries which emulate the reasoning of an expert credit analyst through the output means, a user to enter through the input means, in a predetermined order, data relating to criteria used in making credit recommendations, and which manages such input data;

(ii) a knowledge base containing a plurality of predetermined and defined standardized rating values relating to data on criteria (iii) an expert credit recommendation computer program; which manipulates and performs operations on the input data in association with the database management program and the knowledge base wherein the digital computer utilizes the expert credit recommendation computer program in conjunction with the data input by the user to assign to each of the criteria a standardized rating value from the knowledge base and to utilize such assigned standardized rating value to simulate a plurality of decision matrices arranged in a defined decision matrix tree series, having a financial branch and a dealer rating branch;

wherein, for each branch point in the matrix tree series the system determines and assigns a defined standardized rating value to a resulting criterion; which standardized rating value is applied in a subsequent decision matrix until a final decision matrix is reached; and wherein after all the data has been entered by the user in the predetermined sequence of queries, the system generates an overall rating which is displayed to the user on the output means specified by the standardized rating value assigned to a final criterion resulting from the financial branch and the standardized rating value assigned to a final criterion resulting from the dealer rating branch.

2. A computerized expert credit recommendation system as in claim 1, wherein the system further comprises a means for determining a credit recommendation by comparing the defined standardized rating value assigned to a net hard collateral criterion against the overall rating so as to determine and assign a defined standardized rating value to a final rating criterion, which final rating criterion's assigned defined standardize rating value is compared against the standardized rating value assigned to a credit recommendation matrix input criterion to arrive at the credit recommendation; and a means for communicating the credit recommendation to the output means.

3. A computerized expert credit recommendation system as in claim 2, wherein the system further comprises a means for formulating and communicating to the output means comments on the credit recommendation.

4. A method of determining a credit recommendation, comprising:
   a) providing to a computer comprising an input means and an output means, a database management program and an expert credit recommendation computer program;

the computer and the expert recommendation computer program operating to simulate a plurality of decision matrices utilizing standardized rating values, said matrices being configured in a defined decision matrix tree series, comprising a financial branch and a dealer rating branch;

wherein the computer and the database management program prompt a user through the output means, via screen prompts generating in a pre-determined sequence and communicated to the output means, to enter data related to specific criteria in a sequence and manner which emulates the reasoning of an expert credit analyst;

b) entering the data related to the criteria through the input means, in response to the prompts;

c) determining and assigning a defined standardized rating value to the data relating to the criteria for which data has been entered, and applying the standardized rating values assigned to those criteria and to the resulting criteria to the decision matrices in a predetermined manner according to the defined decision matrix tree series until a final decision matrix is reached; and d) comparing the defined standardized rating value assigned to a final resulting criterion from the financial branch against a final resulting criterion from the dealer rating branch in the final decision matrix to arrive at an overall rating.

5. A method of determining a credit recommendation as in claim 4, further comprising communicating the overall rating to the output means.

6. A method of determining a credit recommendation as in claim 4, wherein the overall rating is compared against the standardized rating value assigned to a net hard collateral criterion so as to determine a standardized rating value for a final rating criterion; and
   comparing the standardized rating value assigned to the final rating criterion against the standardized rating value assigned to a credit recommendation matrix input criterion so as to produce the credit recommendation.

7. A method of determining a credit recommendation as in claim 6, further comprising communicating the credit recommendation to the output means.

8. A method of determining a credit recommendation as in claim 4, wherein the financial branch comprises an interim balance sheet decision matrix, an interim income trend decision matrix, and interim income statement decision matrix, an interim balance sheet and trend decision matrix, an interim income statement and trend decision matrix, an interim financial decision matrix, a balance sheet decision matrix, an income trend decision matrix, an income statement decision matrix, a balance sheet and trend decision matrix, an income statement and trend decision matrix, and a fiscal-year-end decision matrix; and
   the dealer rating branch comprises a lender experience decision matrix, an owner experience decision matrix, a business pay habits decision matrix, a business experience decision matrix, a business character decision matrix, a character decision matrix, a manufacturing strength decision matrix, a dealer collateral decision matrix, a manufacturing collateral decision matrix and a collateral decision matrix.

9. A computerized expert credit recommendation system as in claim 1, wherein the system operates to simulate decision matrices configured in a defined matrix tree series as in FIGS. 1–4.

* * * * *

UNITED STATES PATENT AND TRADEMARK OFFICE
CERTIFICATE OF CORRECTION

PATENT NO. : 5,262,941

DATED : November 16, 1993

INVENTOR(S) : Saladin et al.

It is certified that error appears in the above-identified patent and that said Letters Patent is hereby corrected as shown below:

col. 6, line 50, "compare" should read --compares--;

col. 10, line 11, "mp" should read --np--;

col. 11, line 24, "ize" should read --ized--;

col. 11, line 49 "generating" should read --generated--;

col. 11, line 54 after "entering" delete "the";

Signed and Sealed this

Thirtieth Day of August, 1994

BRUCE LEHMAN

*Attest:*

*Attesting Officer*    *Commissioner of Patents and Trademarks*